(12) United States Patent
Yang et al.

(10) Patent No.: US 10,879,738 B2
(45) Date of Patent: Dec. 29, 2020

(54) ELECTRONIC APPARATUS

(71) Applicant: Wistron Corporation, New Taipei (TW)

(72) Inventors: Yi-Fang Yang, New Taipei (TW); Wei-Cheng Chiu, New Taipei (TW); Wen-Hsin Hsiao, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/531,112

(22) Filed: Aug. 4, 2019

(65) Prior Publication Data

US 2020/0381943 A1 Dec. 3, 2020

(30) Foreign Application Priority Data

May 27, 2019 (TW) .............................. 108118207 A (51) Int. Cl.
*H02J 50/10* (2016.01)
*H02J 7/02* (2016.01)
*H02J 7/00* (2006.01)

(52) U.S. Cl.
CPC .............. *H02J 50/10* (2016.02); *H02J 7/00* (2013.01); *H02J 7/025* (2013.01)

(58) Field of Classification Search
CPC .............. H02J 50/10; H02J 7/00; H02J 7/025
See application file for complete search history.

(56) References Cited

U.S. PATENT DOCUMENTS

| | | | |
|---|---|---|---|
| 9,035,600 B2 | 5/2015 | Park et al. | |
| 9,350,183 B2 | 5/2016 | Park et al. | |
| 9,730,002 B2 | 8/2017 | van der Lee et al. | |
| 2011/0241603 A1* | 10/2011 | Chang | H02J 7/025 320/101 |
| 2011/0241614 A1 | 10/2011 | Yeh | |
| 2012/0161697 A1 | 6/2012 | Park et al. | |

(Continued)

FOREIGN PATENT DOCUMENTS

| | | |
|---|---|---|
| CN | 1512642 | 7/2004 |
| CN | 1309143 | 4/2007 |

(Continued)

OTHER PUBLICATIONS

"Office Action of Taiwan Counterpart Application," dated Dec. 27, 2019, p. 1-p. 11.

*Primary Examiner* — Rexford N Barnie
*Assistant Examiner* — Terrence R Willoughby
(74) *Attorney, Agent, or Firm* — JCIPRNET (57) ABSTRACT

An electronic apparatus including a hand-held electronic device and a platform device is provided. The platform device is detachably connected to the hand-held electronic device. The platform device includes a power supply, a power management device, a wireless power management circuit and an antenna. The power supply is used to provide a supply power. The power management device generates at least one operation power according to the supply power. The wireless power management circuit generates a wireless power according to the at least one operation power. The antenna of the platform device performs a charging operation on at least one to-be-charged device through an electromagnetic induction according to the wireless power.

14 Claims, 7 Drawing Sheets

(56) References Cited

U.S. PATENT DOCUMENTS

| | | | | |
|---|---|---|---|---|
| 2015/0091509 A1* | 4/2015 | Zhou | ............... | H02J 7/025 320/108 |
| 2015/0236539 A1 | 8/2015 | Park et al. | | |
| 2015/0296328 A1 | 10/2015 | van der Lee et al. | | |

FOREIGN PATENT DOCUMENTS

| CN | 102593883 | 7/2012 |
|---|---|---|
| CN | 104981123 | 10/2015 |
| CN | 206323162 | 7/2017 |
| TW | M389866 | 10/2010 |
| TW | M478950 | 5/2014 |

* cited by examiner

ELECTRONIC APPARATUS

CROSS-REFERENCE TO RELATED APPLICATION

This application claims the priority benefit of Taiwan application serial no. 108118207, filed on May 27, 2019. The entirety of the above-mentioned patent application is hereby incorporated by reference herein and made a part of this specification.

TECHNICAL FIELD

The invention relates to an electronic apparatus, and more particularly, to an electronic apparatus having a detachable platform device capable of providing wireless charging power.

BACKGROUND

In today's society, electronic apparatuses have become an indispensable tool in people's lives. Especially in business, users often need to carry a variety of electronic apparatuses on the business trip. When one of the electronic apparatuses is unable operate normally due to insufficient power, as limited by the problem of connection ports, such electronic apparatus cannot be charged by using the other electronic apparatuses with sufficient power, resulting in inconvenience in use.

SUMMARY

The invention provides an electronic apparatus, which has a detachable platform device with the capability of performing a wireless charging on external electronic apparatuses.

The electronic apparatus of the invention includes a hand-held electronic device and a platform device. The platform device is detachably connected to the hand-held electronic device. The platform device includes a power supply, a power management device, a wireless power management circuit and at least one antenna. The power supply is used to provide a supply power. The power management device is coupled to the power supply, and generates at least one operation power according to the supply power. The wireless power management circuit is coupled to the power management device, and generates a wireless power according to the at least one operation power. The at least one antenna is coupled to the wireless power management circuit. The platform device includes the at least one antennas, which is configured to charge at least one to-be-charged device through an electromagnetic induction according to the wireless power.

Based on the above, the electronic apparatus of the invention has the detachable hand-held electronic device and a platform device which are detachably connected to each other. The platform device has the at least one antenna used to provide an electromagnetic wave and perform a charging operation on the to-be-charged device through the electromagnetic induction.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
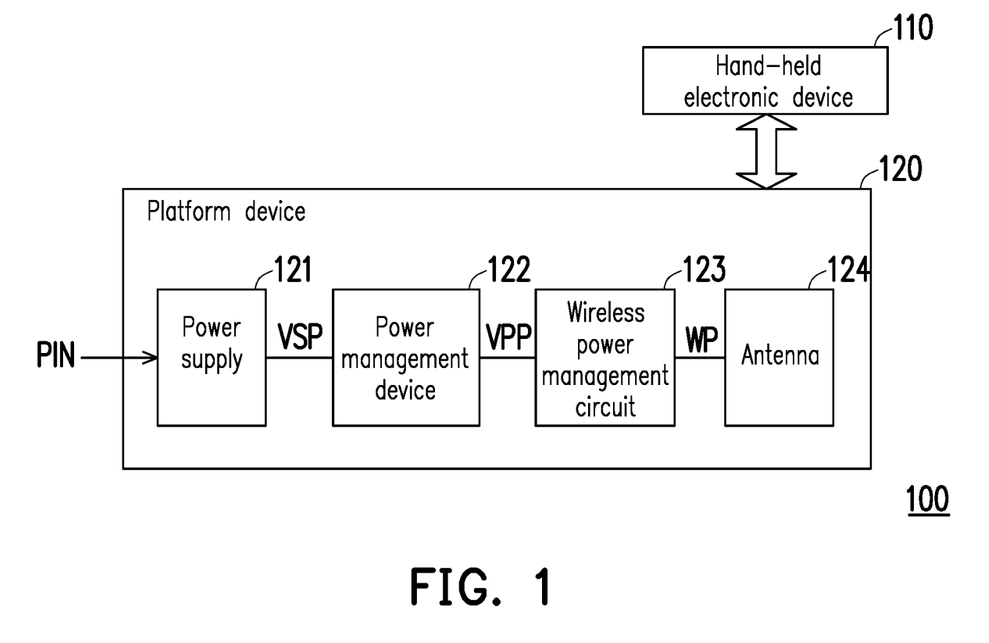
FIG. 1 illustrates a schematic diagram of an electronic apparatus in an embodiment of the invention.

With reference to FIG. 1, FIG. 1 illustrates a schematic diagram of an electronic apparatus in an embodiment of the invention. An electronic apparatus 100 includes a hand-held electronic device 110 and a platform device 120. The platform device 120 is detachably connected to the hand-held electronic device 110. When the platform device 120 and the hand-held electronic device 110 are connected to each other, the electronic apparatus 100 may be used as a notebook computer. Relatively, when the platform device 120 and the hand-held electronic device 110 are separated from each other, the hand-held electronic device 110 may be used as a tablet computer.

In this embodiment, the platform device 120 includes a power supply 121, a power management device 122, a wireless power management circuit 123 and at least one antenna 124. The power supply 121 is configured to provide a supply power VSP. In an embodiment of the invention, the power supply 121 can receive an alternating current power PIN and generate the supply power VSP according to the alternating current power PIN. The power supply 121 may also generate the supply power VSP through the electricity energy stored in an internally disposed electricity storer.

In addition, the power management device 122 is coupled to the power supply 121. The power management device 122 is configured to perform a voltage converting operation on the supply power VSP generated by the power supply 121 to generate one or more operation powers VPP. Here, the power management device 122 can perform a voltage adjusting operation, a boosting operation and/or a bucking operation on the power voltage VSP to generate the operation power VPP. It should be noted that, the platform device 120 can include a plurality of electronic components in different types. The platform device 120 can perform the voltage converting operation according to voltage values of the powers required for operating the electronic components in different types. In terms of hardware architecture, the power manager 122 may include at least one of a voltage regulator, a boost type DC-DC converter and a buck type DC-DC converter. The hardware architecture regarding the voltage regulator, the boost type DC-DC converter and the buck type DC-DC converter may be implemented by the hardware architecture well known to those with ordinary skill in the art.

On the other hand, the wireless power management circuit 123 is coupled to the power management device 122, and configured to receive the operation power VPP generated by the power management device 122. The wireless power management circuit 123 is configured to generate a wireless power WP according to the operation power VPP, and transmit an electromagnetic wave through the antenna 124 according to the wireless power WP. In this embodiment, the wireless power management circuit 123 can provide the electromagnetic wave that meets the Qi wireless charging standard according to the wireless power WP. Further, in this embodiment, the number of the antennas 124 may be one or may be plural.

It should be noted that, the platform device 120 in the embodiment of the invention may include a setup platform. Here, an upper surface of the setup platform may be used to carry one or more to-be-charged devices. The antenna 124 is disposed below the setup platform corresponding to the upper surface of the setup platform. The to-be-charged device of the present embodiment may be any electronic device that can receive the electromagnetic wave for wireless charging without particular limitation. Implementation details of the setup platform will be described more specifically in the subsequent embodiments.

In this embodiment, the hand-held electronic device 110 and the platform device 120 can be connected to each other in an electrical coupling manner. When the hand-held electronic device 110 and the platform device 120 are connected to each other, the platform device 120 can transmit the operation power VPP and/or a control signal to the hand-held electronic device 110 through electrically coupled connection interfaces. When the hand-held electronic device 110 is physically separated from the platform device 120, the hand-held electronic device 110 and the platform device 120 can perform a transmitting operation of the control signal through a wireless signal transceiving interface. In the embodiment of the invention, the wireless signal transceiving interface may be a Bluetooth wireless transmission interface of or any other type of wireless transmission interface well known to those with ordinary skill in the art. Naturally, the hand-held electronic device 110 may also be disposed on the setup platform of the platform device 120 so a charging operation can be performed by receiving the electromagnetic wave transmitted by the platform device 120.

Here, it should be noted that, the hand-held electronic device 110 may be installed with an application to perform a controlling operation on the platform device 120. For example, the hand-held electronic device 110 may send commands through the application to control whether to make the wireless signal transceiving interface 123 in the platform device 120 perform a generating operation of the wireless power WP in a wireless manner (through the wireless signal transceiving interface) or a wired manner (through a connector between the hand-held electronic device 110 and the platform device 120). In brief, a deactivating operation may be performed through the application on the hand-held electronic device 110 when the user intends to deactivate a wireless charging operation provided by the platform device 120. Relatively, an activating operation may be performed through the application on the hand-held electronic device 110 when the user intends to activate the wireless charging operation provided by the platform device 120.

Figure 2:
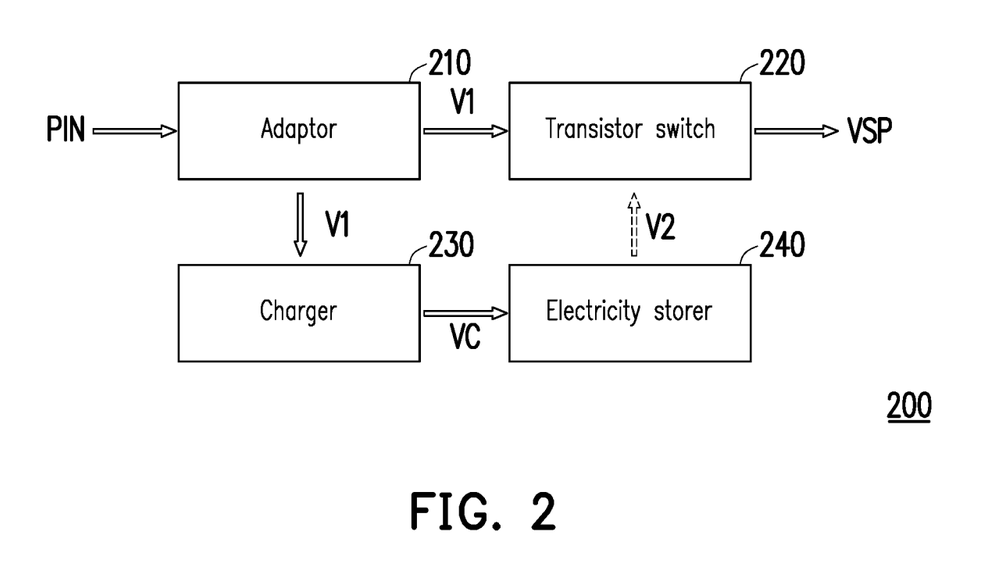
FIG. 2 illustrates a schematic diagram of an implementation of the power supply in an embodiment of the invention.

With reference to FIG. 2, FIG. 2 illustrates a schematic diagram of an implementation of the power supply in an embodiment of the invention. A power supply 200 includes an adapter 210, a transistor switch 220, a charger 230 and an electricity storer 240. The adapter 210 is configured to receive the alternating current power PIN, and perform operations like rectification, transformation and the like on the alternating current power PIN to generate a power V1. The adapter 210 is coupled to the charger 230, and configured to provide the power V1 to the charger 230. The charger 230 receives the power V1 and generates a charging power VC according to the power V1. The charging power VC may be provided to the electricity storer 240 to perform a charging operation on the electricity storer 240. In this embodiment, the electricity storer 240 may be a battery (e.g., a lithium battery), a super capacitor or any other type of electricity storage component. It should be noted that, the charger 230 may perform a generating operation of the charging power VC according to an electricity storage state of the electricity storer 240. More specifically, according to a remaining power of the electricity storer 240, the charger 230 can adjust a current magnitude of the provided charging power VC for charging the electricity storer 240.

On the other hand, the transistor switch 220 is coupled to the adapter 210 and the electricity storer 240. The transistor switch 220 can receive the power V1 provided by the adapter 210 and a power V2 provided by the electricity storer 240, and select one of the powers V1 and V2 to generate the supply power VSP.

As for the details regarding operations of the power supply 200, when the alternating current power PIN is received by the adapter 210, the adapter 210 can generate the power V1 according to the alternating current power PIN and make the charger 230 generate the charging power VC according to the power V1 to perform the charging operation on the electricity storer 240. This charging operation may be completed after the power in the electricity storer 240 reaches a certain ratio. In addition, the adapter 210 also provides the power V1 to the transistor switch 220. Under the condition that the alternating current power PIN is received by the adapter 210, the adapter 210 can correspondingly transmit the control signal to the transistor switch 220, and the transistor switch 220 can select the power V1 according to the control signal to generate the supply power VSP.

Relatively, when the alternating current power PIN is not received by the adapter 210, the electricity storer 240 can provide the power V2 to the transistor switch 220. The transistor switch 220 can generate the supply power VSP based on the power V2 according to the control signal to.

In this embodiment of the invention, the transistor 220 can receive the control signal with high voltage level or low voltage level, and select the powers V1 or V2 according to the voltage level of the control signal to generate the supply power VSP.

Figure 3:
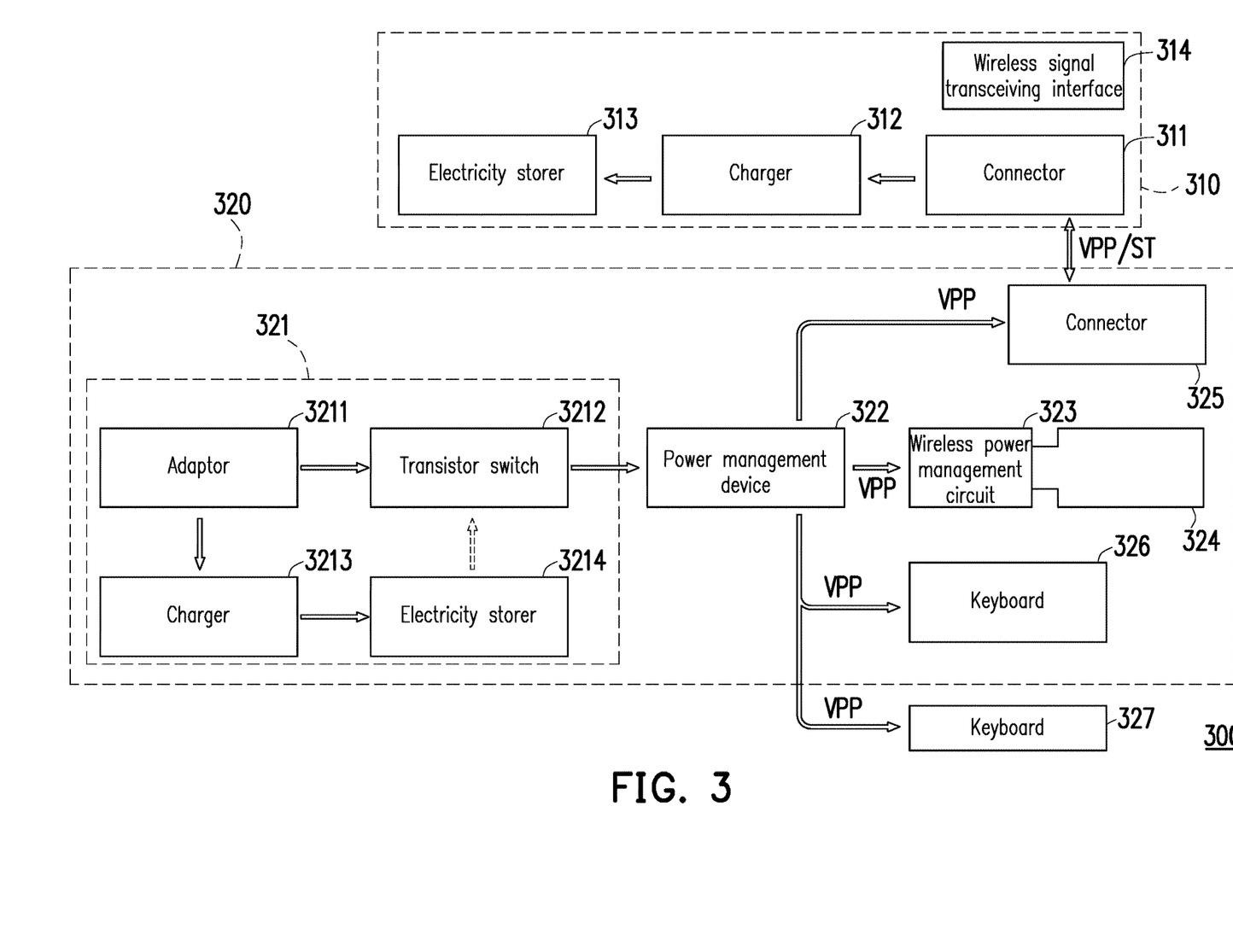
FIG. 3 illustrates a schematic diagram of an electronic apparatus in another embodiment of the invention.

With reference to FIG. 3, FIG. 3 illustrates a schematic diagram of an electronic apparatus in another embodiment of the invention. An electronic apparatus 300 includes a hand-held electronic device 310 and a platform device 320. The platform device 320 is detachably connected to the hand-held electronic device 310. The platform device 320 includes a power supply 321, a power management device 322, a wireless power management circuit 323, an antenna 324, a connector 325 and a peripheral device 326. The power supply 321 is configured to generate a supply power, and provide the supply power to the power management device 322. In this embodiment, the power supply 321 includes an adapter 3211, a transistor switch 3212, a charger 3213 and an electricity storer 3214. Implementation details regarding the power supply 321 have been explained comprehensively in the above embodiment of FIG. 2, which are not repeated hereinafter.

The power management device 322 receives the supply power, and generates an operation power VPP according to the supply power. The power management device 322 provides the operation power VPP to the wireless power management circuit 323 and the peripheral device 326, and is able to transmit the operation power VPP to the connector 325. In this embodiment, the connector 325 is configured to electrically couple with the hand-held electronic device 310. The connector 325 may also be used to transmit the operation power VPP to the hand-held electronic device 310. Further, the connector 325 may also be used to perform a transmitting operation of a control signal ST with the hand-held electronic device 310. In this embodiment, the form of the connector 325 is not particularly limited. The connector 325 may be, for example, a spring connector (POGO pin) or a connector in other forms well known to those with ordinary skill in the art.

Incidentally, in this embodiment, the electronic apparatus 300 may also be connected to a keyboard 327. The power management device 322 can provide the operation power VPP to the keyboard 327 such that the keyboard 327 can operate normally.

On the other hand, the wireless power management circuit 323 generates a wireless power according to the operation power VPP, and transmits an electromagnetic wave through the antenna 324 according to the wireless power. The electromagnetic wave may be transmitted to one or more to-be-charged devices outside the platform device 320, and used to perform a charging operation on at least one to-be-charged device through an electromagnetic induction according to the wireless power.

In addition, the hand-held electronic device 310 includes a connector 311, a charger 312, an electricity storer 313 and a wireless signal transceiving interface 314. The connector 311 is configured to be detachably connected with the platform device 320 through the connector 325. The charger 312 is coupled to the connector 311, and receives the operation power VPP from the connector 325. Also, the charger 312 can generate a charging power according to the operation power VPP, and perform the charging operation on the electricity storer 313. The electricity storer 313 may be a battery (a lithium battery), a super capacitor or any other type of electricity storage component.

In this embodiment, the wireless signal transceiving interface 314 may be a near or remote wireless signal transceiving interface, such as a Bluetooth transmission interface, a WIFI or NFC (Near-Field Communication) interface. When the hand-held electronic device 310 is physically separated from the platform device 320, the hand-held electronic device 310 and the platform device 320 can perform an information transmission operation respectively through the wireless signal transceiving interface 314 and the peripheral device 326. When the wireless signal transceiving interface 314 is the Bluetooth transmission interface, the peripheral device 326 may include the Bluetooth transmission interface.

Naturally, when the hand-held electronic device 310 and the platform device 320 are not connected to each other through the connectors 311 and 315, the hand-held electronic device 310 may also be placed on a setup platform on the platform device 320 so the hand-held electronic device 310 can be charged through the electromagnetic induction of the electromagnetic wave received from the antenna 324 of the platform device 320.

Figure 4:
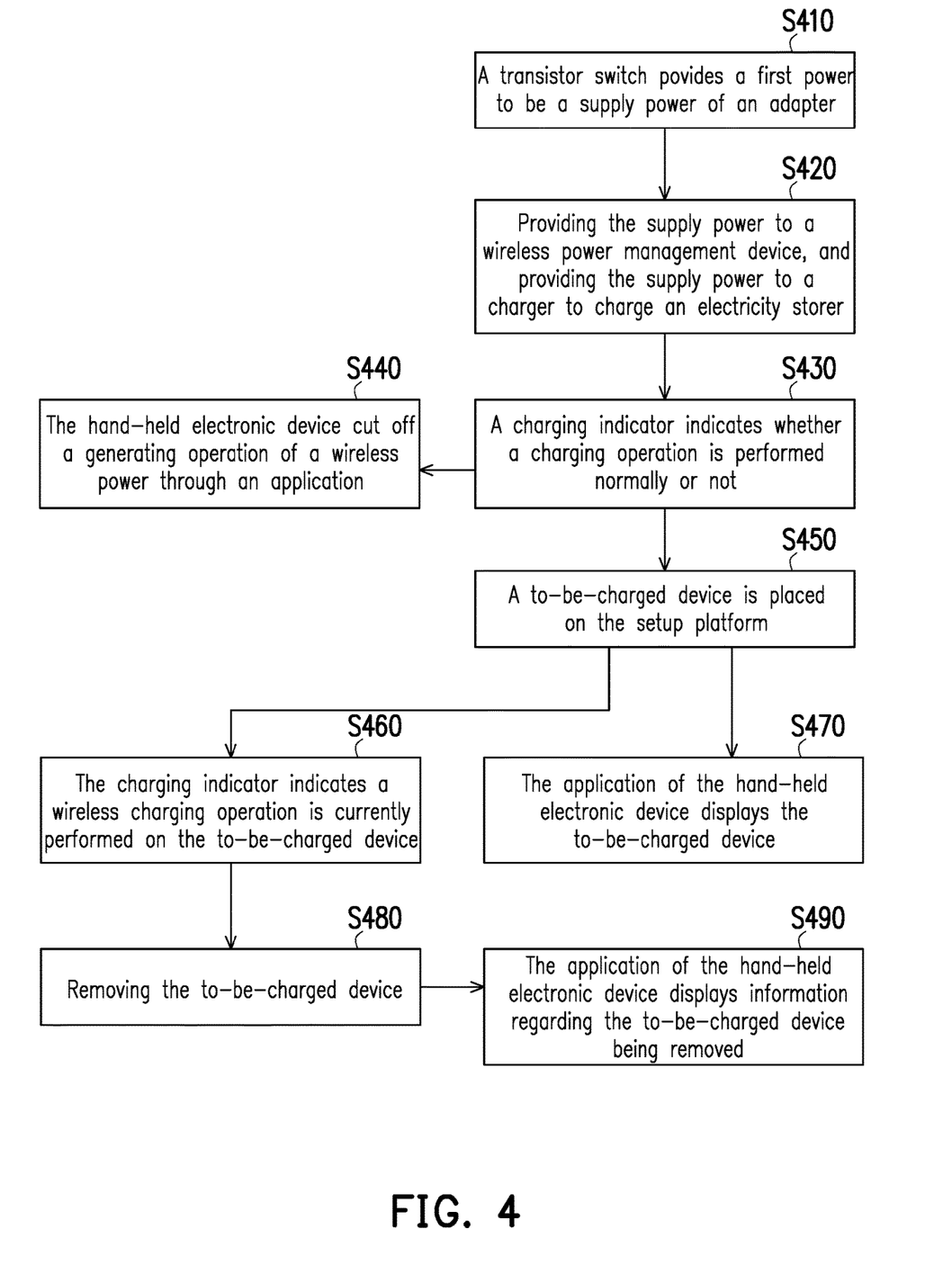
FIG. 4 illustrates an operation flowchart of the electronic apparatus in an embodiment of the invention.

With reference to FIG. 4, FIG. 4 illustrates an operation flowchart of the electronic apparatus in an embodiment of the invention. On a platform device, when an external alternating current power is received by an adapter, in step S410, a transistor switch provides a first power generated by the adapter as a supply power. In step S420, the supply power is provided to a wireless power management device, and the supply power is provided to a charger to charge an electricity storer. Next, in step S430, a charging indicator indicates whether a charging operation is performed normally or not. Here, the charging indicator may be disposed on any part of the platform device, and the charging indicator may be constructed by a light emitting diode to indicate whether the charging operation is performed normally by transmitting light beams with different wavelengths.

On the other hand, a to-be-charged device is placed on the setup platform of the platform device (step S450). In step S460, the charging indicator indicates that a wireless charging operation is currently performed on the to-be-charged device. Also, in step S470, the charging to-be-charged device is displayed through an application of the hand-held electronic device. On the other hand, in step S440, the hand-held electronic device can cut off a generating operation of a wireless power through the application and stop the charging operation on the to-be-charged device.

After the charging operation on the to-be-charged device is completed, the to-be-charged device is removed in step S480, and information regarding the to-be-charged device being removed is displayed through the application of the hand-held electronic device in step S490.

Figure 5:
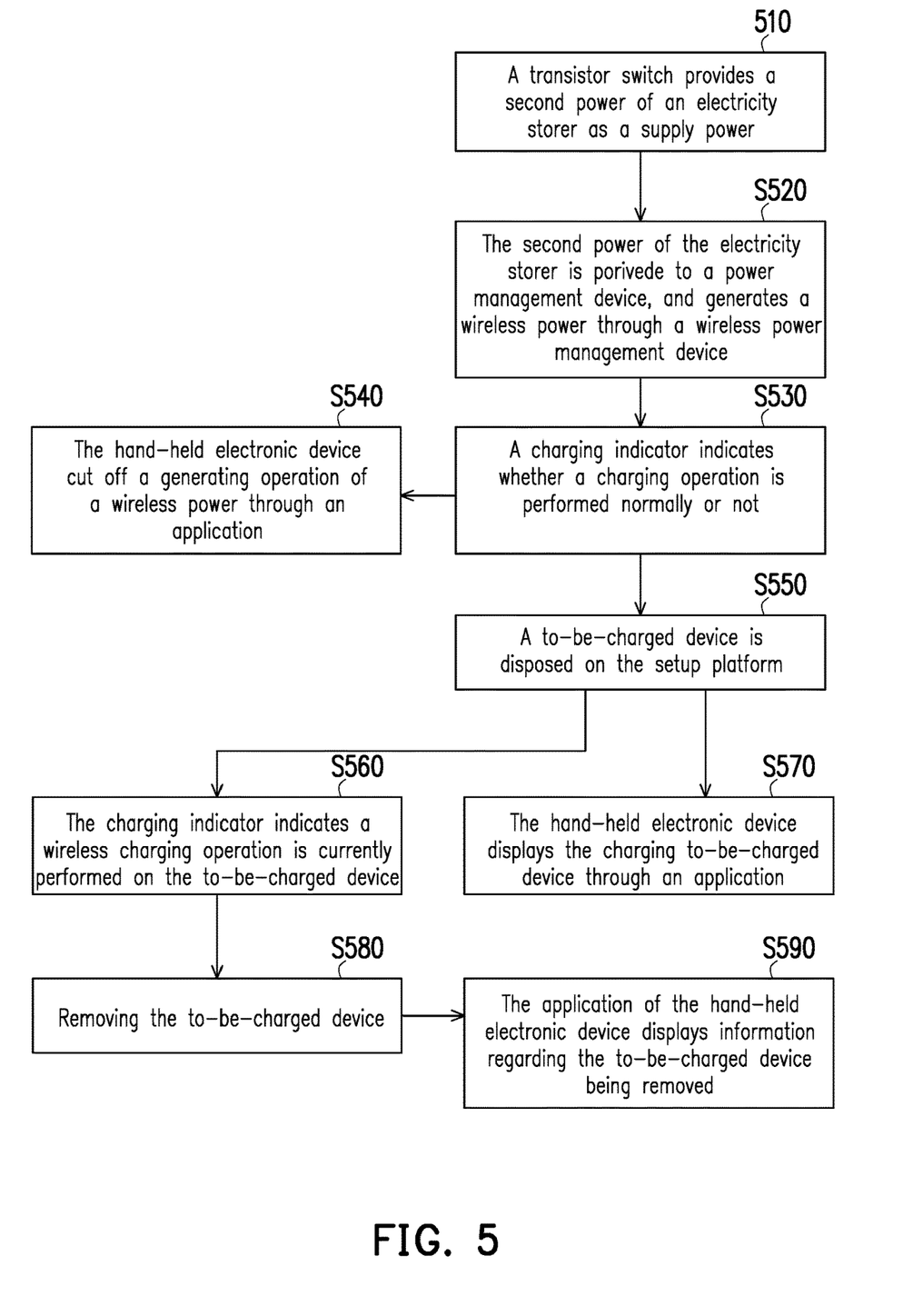
FIG. 5 illustrates another operation flowchart of the electronic apparatus in an embodiment of the invention.

With reference to FIG. 5, FIG. 5 illustrates another operation flowchart of the electronic apparatus in an embodiment of the invention. On a platform device, when an external alternating current power is not received by an adapter, in step S510, a transistor switch provides a second power generated by an electricity storer as a supply power. In step S520, the supply power (the second power generated by the electricity storer) is provided to a wireless power management device, and the supply power is provided to a charger to charge an electricity storer. Next, in step S530, a charging indicator indicates whether a charging operation is performed normally. Here, the charging indicator may be disposed on any part of the platform device, and the charging indicator may be constructed by a light emitting diode to indicate whether the charging operation is performed normally by transmitting light beams with different wavelengths.

On the other hand, a to-be-charged device is placed on the setup platform of the platform device (step S550). In step S560, the charging indicator indicates that a wireless charging operation is currently performed on the to-be-charged device. Also, in step S570, the charging to-be-charged device is displayed through an application of the hand-held electronic device. On the other hand, in step S540, the hand-held electronic device can cut off a generating operation of a wireless power through the application and stop the charging operation on the to-be-charged device.

After the charging operation on the to-be-charged device is completed, the to-be-charged device is removed in step S580, and information regarding the to-be-charged device being removed is displayed through the application of the hand-held electronic device in step S590.

Figure 6:
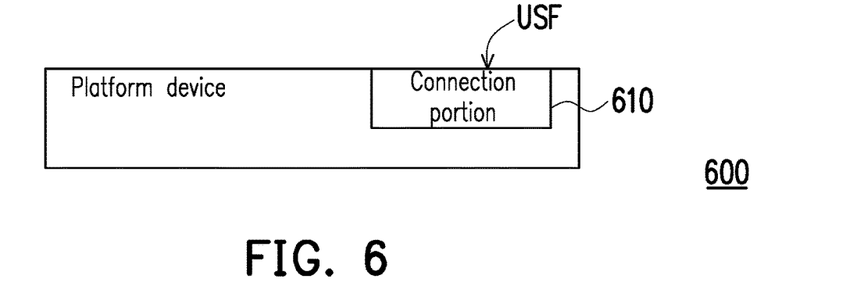
FIG. 6 illustrates a schematic diagram of a platform device in an embodiment of the invention.

With reference to FIG. 6, FIG. 6 illustrates a schematic diagram of a platform device in an embodiment of the invention. A platform device 600 includes a housing USF. A connection portion 610 may be disposed on the housing USF. The housing USF may be used to accommodate various electronic components in the platform device such as a power supply, a power management device, a wireless power management circuit and an antenna.

Figure 7A:
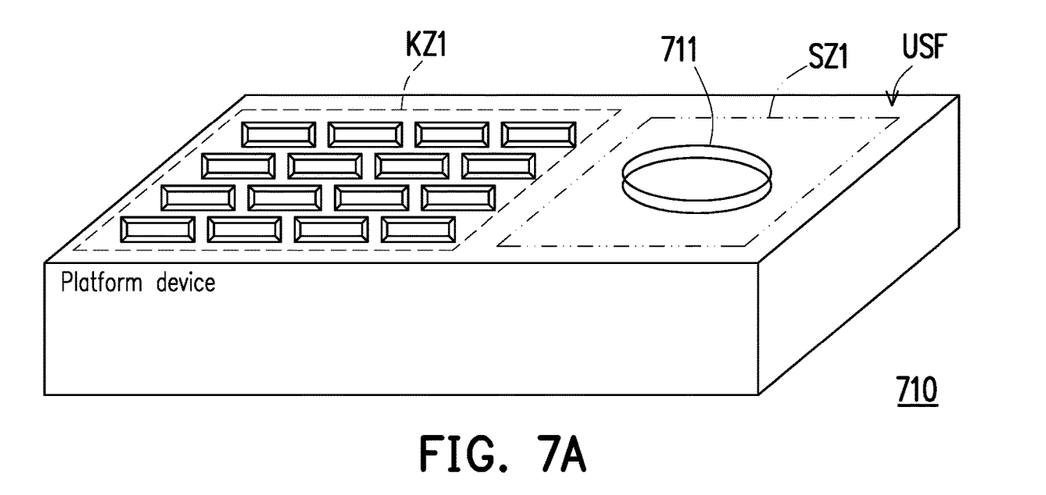
FIG. 7A to FIG. 7C respectively illustrate schematic diagrams of multiple implementations of the platform device of the invention.
Figure 7B:
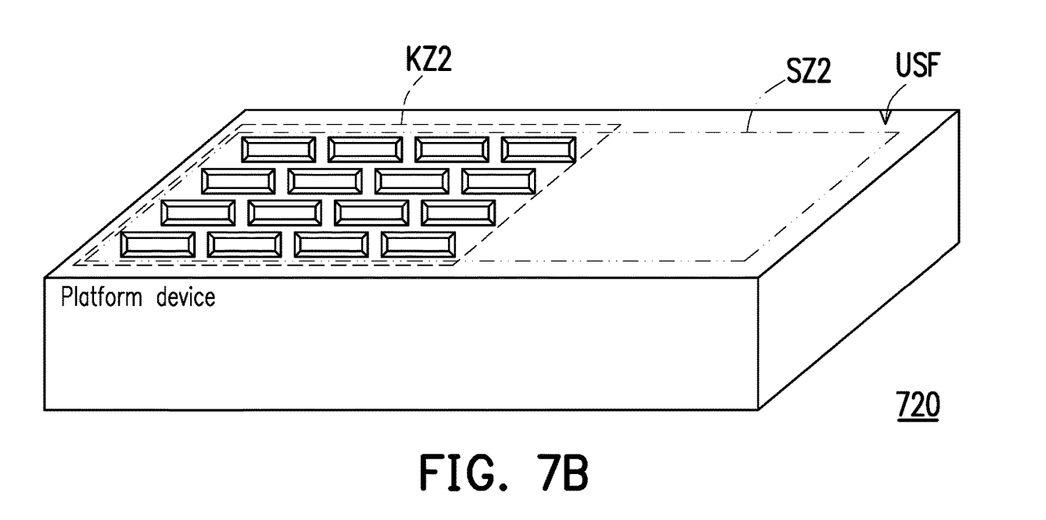
Figure 7C:
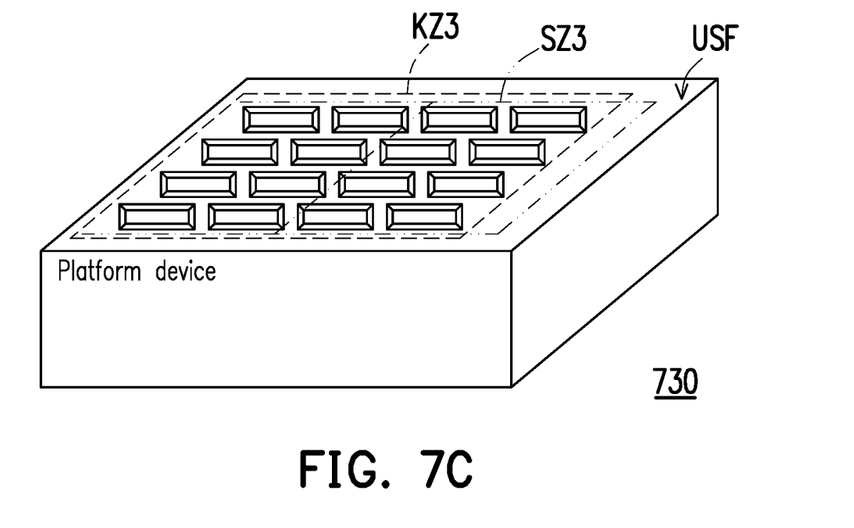

With reference to FIG. 7A to FIG. 7C, FIG. 7A to FIG. 7C respectively illustrate schematic diagrams of multiple implementations of the platform device of the invention. In FIG. 7A, a zone on an upper surface of the housing USF of the platform device 710 is laid out to be a setup platform SZ1. The upper surface of the housing USF includes a zone for disposing a keyboard KZ1. In FIG. 7A, distributed areas of the setup platform SZ1 and the keyboard KZ1 are separated from each other without overlapping with each other. An antenna 711 for transmitting an electromagnetic wave according to a wireless power is disposed below the setup platform SZ1.

In FIG. 7B, as another implementation, a distributed area of a setup platform SZ2 can completely cover a distributed area of a keyboard KZ2 on a platform device 720. In the implementation of FIG. 7C, a distributed area of a setup platform SZ3 can cover a part of a distributed area of a keyboard KZ3 on a platform device 730.

As can be learnt from the implementation above, in the embodiments of the invention, the distributed areas of the setup platform and the keyboard may completely overlap, partially overlap or not overlap with each other.

Figure 8:
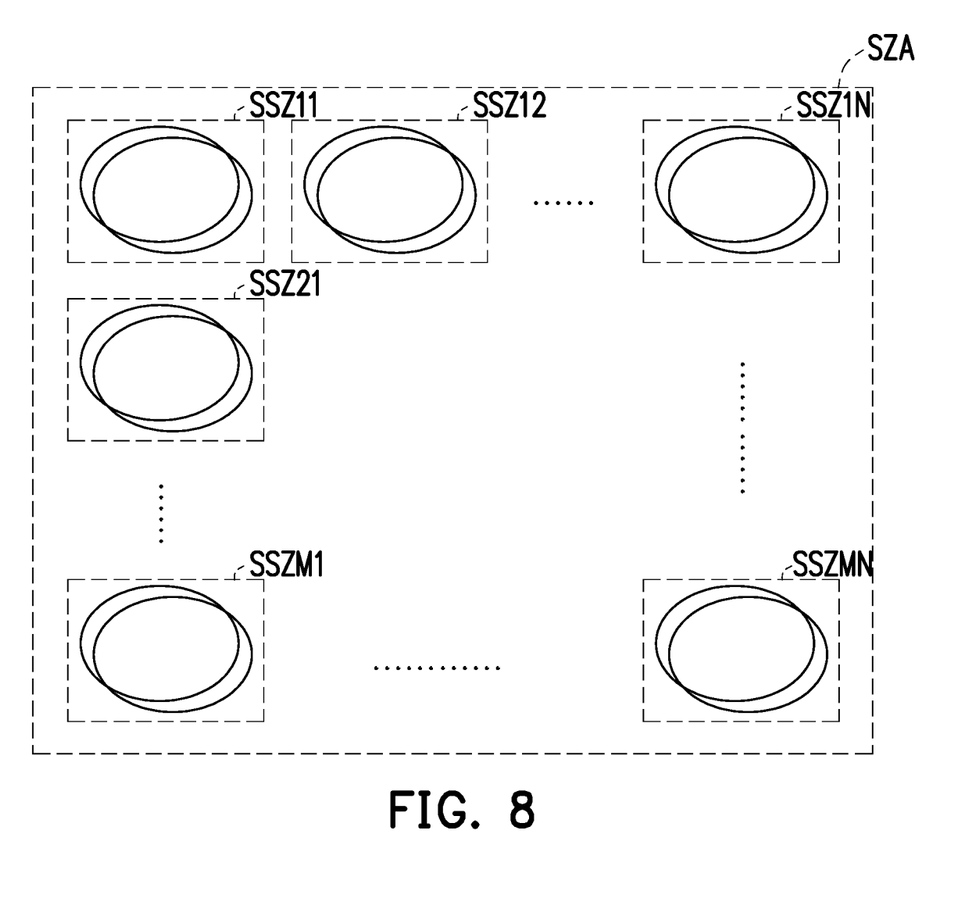
FIG. 8 illustrates a schematic diagram of an implementation of a positional relationship between the platform device and the antennas in an embodiment of the invention.

With reference to FIG. 8, FIG. 8 illustrates a schematic diagram of an implementation of a positional relationship between the platform device and the antennas in an embodiment of the invention. In this embodiment, a plurality of antennas may be disposed respectively corresponding to a plurality of the sub-zones SSZ11 to SSZMN of a setup platform SZA on the platform device. The sub-zones SSZ11 to SSZMN may be arranged in form of an array. In other embodiments of the invention, the sub-zones SSZ11 to SSZMN may also be arranged in a regular or irregular manner. When performing a transmitting operation of an electromagnetic wave for wireless charging, the platform device does not need to make all the antennas in the sub-zones SSZ11 to SSZMN perform the transmitting operation of the electromagnetic wave at the same time. In an embodiment of the invention, the platform device can sequentially make all the antennas in the sub-zones SSZ11 to SSZMN perform the transmitting operation of the electromagnetic wave, and determine whether positions on the platform device SZA corresponding to the subs-zones SSZ11 to SSZMN are placed with the to-be-charged device or not (e.g., the positions corresponding to the sub-zones SSZ11, SSZM1 and SSZ1N are placed with the to-be-charged device). Then, the platform device may make only the antennas in the sub-zones SSZ11, SSZM1 and SSZ1N perform the transmitting operation of the electromagnetic wave, so as to prevent unnecessary power consumption.

Incidentally, each time after a preset period is elapsed, the platform device can sequentially make all the antennas in the sub-zones SSZ11, SSZM1 and SSZ1N perform the transmitting operation of the electromagnetic wave, accordingly determine whether there are to-be-charged devices newly placed on the setup platform SZA or not, and then perform the transmitting operation of the electromagnetic wave on the newly placed to-be-charged devices.

Figure 9:
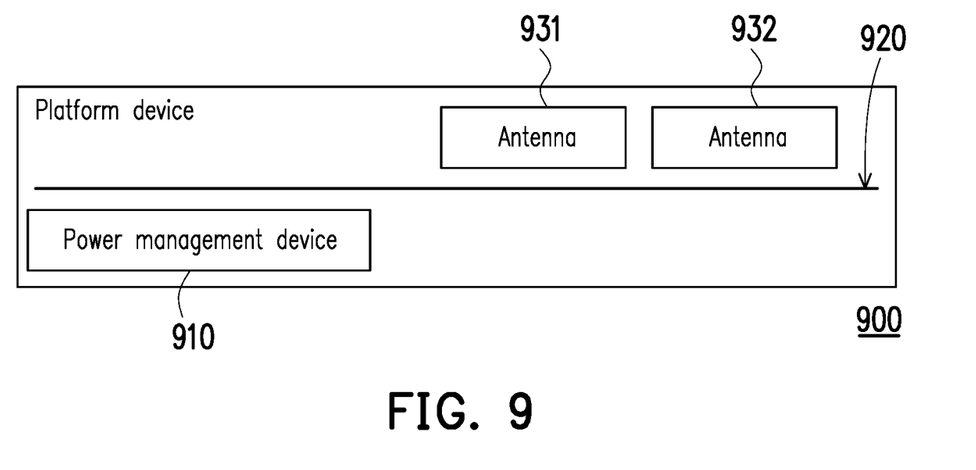
FIG. 9 illustrates a cross-sectional structural view of the platform device of the electronic apparatus in an embodiment of the invention.

With reference to FIG. 9, FIG. 9 illustrates a cross-sectional structural view of the platform device of the electronic apparatus in an embodiment of the invention. In FIG. 9, an isolation layer 920 may be further disposed in a platform device 900. The isolation layer 920 is configured to isolate the antennas 931 and 932 that transmit an electromagnetic wave from a power management device 910 and other chips or circuits, so as to prevent the power management device 910 and other chips or circuits in the platform device 900 from interferences when the electromagnetic wave is transmitted.

In summary, the electronic apparatus provided by the invention has the detachable hand-held electronic device and the platform device. The hand-held electronic device can control the operations on the platform device in the wired or wireless manner, and the platform device can perform the wireless charging operation on the external to-be-charged device through the electromagnetic induction according to the wireless power.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An electronic apparatus, comprising:
   a hand-held electronic device; and
   a platform device, detachably connected to the hand-held electronic device, and comprising:
   a power supply, configured to provide a supply power;
   a power management device, coupled to the power supply, and generating at least one operation power according to the supply power;
   a wireless power management circuit, coupled to the power management device, and generating a wireless power according to the at least one operation power; and
   at least one antenna, coupled to the wireless power management circuit,
   wherein the at least one antenna of the platform device performs a charging operation on at least one to-be-charged device through an electromagnetic induction according to the wireless power,
   wherein the power supply comprises:
   an adapter, receiving an alternating current power and generating a first power according to the alternating current power;
   a charger, receiving the first power and generating a charging power;
   an electricity storer, coupled to the charger, charged according to the charging power, and configured to provide a second power; and
   a transistor switch, coupled to the adapter and the electricity storer, and selecting the first power or the second power as the supply power according to a control signal.

2. The electronic apparatus according to claim 1, wherein the power management device is coupled to the transistor switch, and performs a voltage converting operation on the supply power to generate the at least one operation power.

3. The electronic apparatus according to claim 1, wherein the platform device further comprises:
a housing, configured to accommodate the power supply, the power management device, the wireless power management circuit and the at least one antenna; and
a connection portion, disposed on the housing, and configured to connect the hand-held electronic device.

4. The electronic apparatus according to claim 3, wherein when the platform device and the hand-held electronic device are connected to each other, the platform device is electronically coupled to the hand-held electronic device through the connection portion.

5. The electronic apparatus according to claim 3, wherein the platform device has a setup platform, and the setup platform is disposed in a zone of an upper surface of the housing.

6. The electronic apparatus according to claim 5, wherein the platform device comprises a keyboard, and the keyboard is disposed in the upper surface of the housing.

7. The electronic apparatus according to claim 5, wherein a distributed area of the keyboard completely overlaps, partially overlaps or does not overlap with the setup platform.

8. The electronic apparatus according to claim 5, wherein when a number of the at least one antenna is plural, the zone is divided into a plurality of sub-zones, and the antennas are disposed respectively corresponding to the sub-zones.

9. The electronic apparatus according to claim 8, wherein the wireless power management circuit transmits the wireless power to the antenna separately in a plurality of time intervals.

10. The electronic apparatus according to claim 3, wherein the platform device further comprises:
an isolation layer, disposed between the at least one antenna and the power management device.

11. The electronic apparatus according to claim 1, wherein the platform device further comprises:
a plurality of peripheral devices, coupled to the power management device, and operated according to the at least one operation power.

12. The electronic apparatus according to claim 1, wherein the hand-held electronic device comprises:
a connector, configured to connect the platform device;
a charger, coupled to the connector, receiving the at least one operation power through the connector, and providing a charging power according to the at least one operation power; and
an electricity storer, coupled to the charger, and charged by receiving the charging power.

13. The electronic apparatus according to claim 12, wherein the hand-held electronic device transmits a control command to the platform device through the connector, and the platform device activates or deactivates the operation of generating the wireless power according to the control command.

14. The electronic apparatus according to claim 12, wherein the hand-held electronic device further comprises:
a wireless signal transceiving interface, the hand-held electronic device performing a signal transceiving operation with the platform device through the wireless signal transceiving interface when the hand-held electronic device is separated from the platform device.

* * * * *